United States Patent [19]

Hutmacher

[11] 4,279,365
[45] Jul. 21, 1981

[54] FISHING FLOAT CONTAINER

[76] Inventor: Joan K. Hutmacher, P.O. Box 73, 104 E. Fifth St., Mead, Nebr. 68041

[21] Appl. No.: 200,707

[22] Filed: Oct. 27, 1980

Related U.S. Application Data

[63] Continuation of Ser. No. 71,630, Aug. 31, 1979, abandoned.

[51] Int. Cl.³ .............................................. B60R 7/00
[52] U.S. Cl. .......................... 224/42.42; 224/42.46 R; 211/88
[58] Field of Search ................. 224/42.42 R, 42.46 R, 224/42.45 B, 920; 211/49 R, 86, 88; 248/214; 43/54.5 R, 54.5 A

[56] References Cited

U.S. PATENT DOCUMENTS

| | | | |
|---|---|---|---|
| 1,925,523 | 9/1933 | Cuff et al. | 211/88 |
| 2,672,988 | 3/1954 | Johnson | 211/88 |
| 2,915,353 | 12/1959 | Michaelsen | 211/49 R X |
| 3,163,338 | 12/1964 | Gottsegen | 224/42.46 R X |
| 3,756,481 | 9/1973 | Schaefer | 224/42.46 B X |
| 3,775,895 | 12/1973 | Jachim | 43/54.5 R |
| 4,108,413 | 8/1978 | Goserud | 248/214 |

Primary Examiner—Steven M. Pollard
Attorney, Agent, or Firm—Henderson & Sturm

[57] ABSTRACT

A fishing float container has a horizontal substantially flat base with slightly obtusely oriented curved, reverse tapered leg members disposed upwardly from the forward corners thereof, and a substantially rectangular backing disposed slightly obtusely and upwardly from the rear edge thereof, the backing having apertures for pivotal securement to a hanger member, the hanger being pivotal upward to hook over the side of a boat, and pivotal downward to a locking position wherein fishing floats are secured within the container.

7 Claims, 7 Drawing Figures

FISHING FLOAT CONTAINER

This application is a continuation of application Ser. No. 071,630, filed Aug. 31, 1979 now abandoned.

BACKGROUND OF THE INVENTION

The present invention relates to containers for fishing floats, and more specifically, to any such containers which can be hung from the side of a boat, or elsewhere.

The fishing float depicted symbolically in this application represents the float described in my copending U.S. Pat. application No. 958,589, and the use of the float is described therein. Note, however, that the present invention is not intended to be limited to use with this particular type of float.

In the past, a problem commonly experienced by those using fishing floats was the entanglement of the floats with other articles in the boat, and consequently, their frequent temporary inaccessibility at the critical times when the floats must be dropped from a moving boat to mark a good fishing area. The problem has been created by the common practice of allowing the floats to lie loosely on the bottom of a boat where they roll about and become entangled, and even lost for a time. Simply put, there do not appear to have been any devices in the prior art which hold fishing floats together, up and off the floor where they can be quickly grasped, and dropped or thrown into the water. The ready accessibility of floats in fishing is especially necessary inasmuch as normally a person must use one arm to hold the fishing pole while using the other to grasp the float and throw it.

The present invention overcomes these problems by providing a fishing float container which can be hung inside of the boat to hold the floats in an easily accessible position. The invention, thus, permits a good fishing area to be easily and accurately marked, eliminating the search and disentangling time previously experienced. The instant container also provides for compact and secure storage of the floats when not in use.

SUMMARY OF THE INVENTION

The present invention comprises a wire hanger member pivotally secured to an open walled container. The container includes a base which has a pair of curved legs extending upward and slightly obtusely from its forward rounded corners. A substantially rectangular backing extends upward and slightly obtusely from the rearward edge of the base member. The legs, base and backing together define an open walled container suitable for holding a stack of fishing floats. The backing includes apertures for pivotal securement to a wire hanger. The wire hanger is pivotal to a hanging position wherein it hooks over a boat wall and positions the floats for ready, unobstructed access. The hanger is also pivotal to a storage position wherein the floats are securely and compactly held within the container for storage. The open walled container can be a one piece injection molded plastic unit, with the hanger element easily formed from a bar of rod stock, and very simply attached to the container in a one step assembly.

It is therefore an object of the present invention to provide a container for fishing floats which positions them for ready access.

It is a further object to provide a fishing float container which hangs from the side of the boat, making the fishing floats easily accessible therefrom.

A still further object of the present invention is the provision of fishing float container which prevents the entanglement of fishing floats with other articles in the boat.

Still another object of the present invention is the provision of an open walled container having obtusely oriented forward legs and rearward backing to permit unobstructed access to the fishing floats.

Yet another object of the present invention is the provision of a fishing float container which has a hanger element moveable from a hanging position to a storage position which securely holds the floats even when the container is knocked over or uprighted.

A still further object of the present invention is the provision of a fishing float container which requires minimal raw materials, and requires the assembly merely of an easily formed length of metal bar stock to a one piece injection molded plastic container unit.

These and other objects, advantages and novel features of the present invention will become apparent from the following detailed description of the invention when considered in conjunction with the accompanying drawings.

DESCRIPTION OF THE PREFERRED EMBODIMENT

Figure 1:
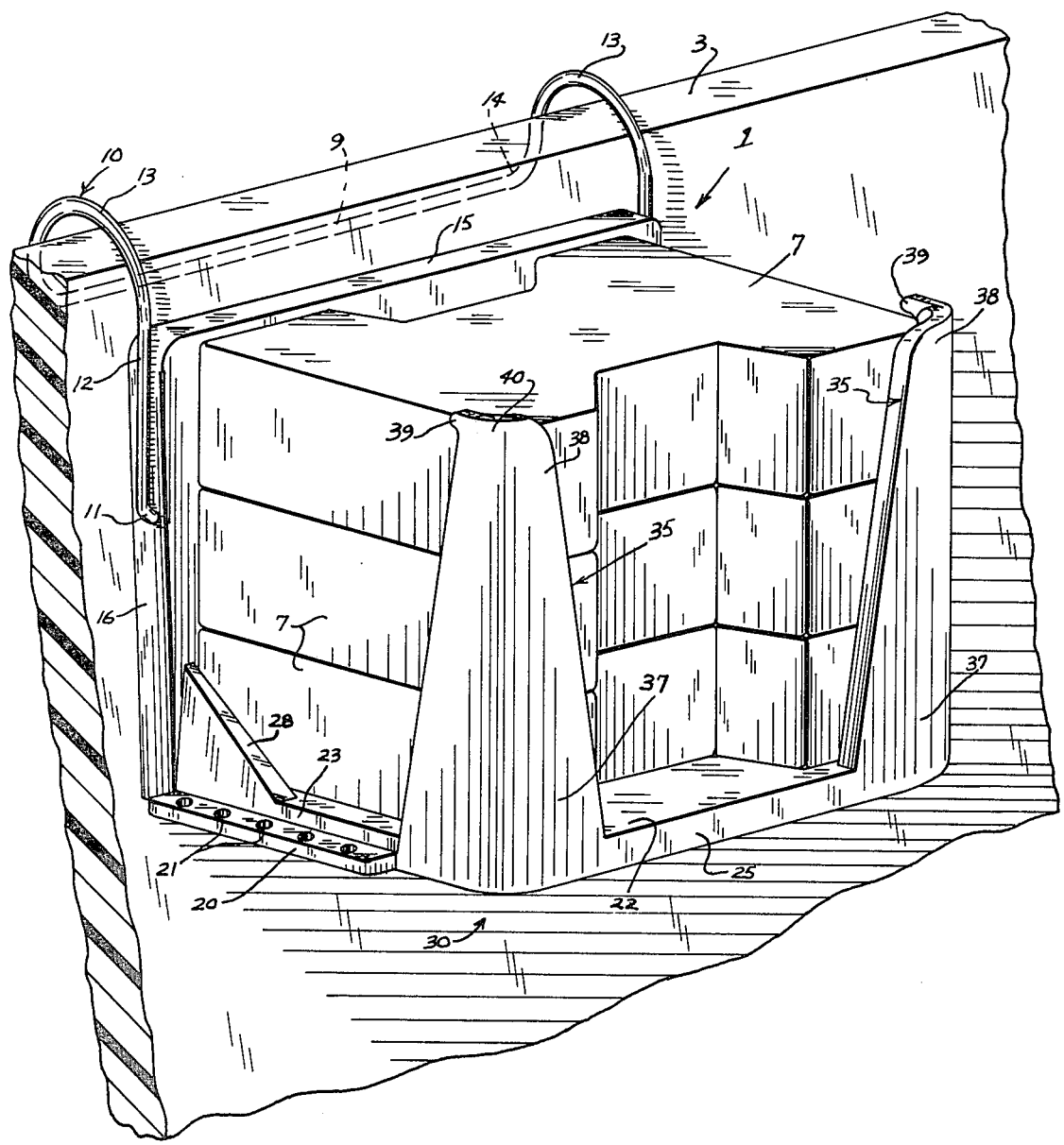
FIG. 1 is a perspective view of the present invention hanging inside a boat from a typical section of boat wall, with three fishing floats symbolically shown stacked therein.

The fishing float container 1 of the present invention, best shown in FIG. 1, is comprised essentially of a curved wire securing means, or hanger 10, pivotally attached to an open-sided substantially rectangular container 30. The float container 1 is secured to a boat side wall 3, and holds three symbolically illustrated fishing floats 7. The floats 7 are described in my copending application Ser. No. 358,589.

Open-sided container 30 has a backing wall 15, base 25, and curved front corner legs 35. In the preferred embodiment, the container 30 is a one piece, injection molded plastic structure. However, it is understood that other materials or methods of manufacture could obviously be employed.

Figure 2:
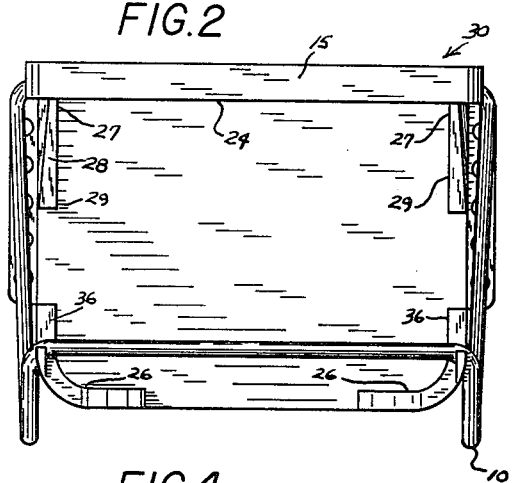
FIG. 2 is a top plan view of the present invention with the hanger element shown in the storage position.
Figure 3:
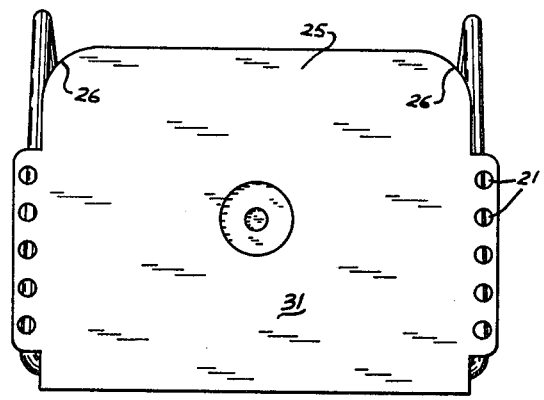
FIG. 3 is a bottom plan view thereof.
Figure 4:
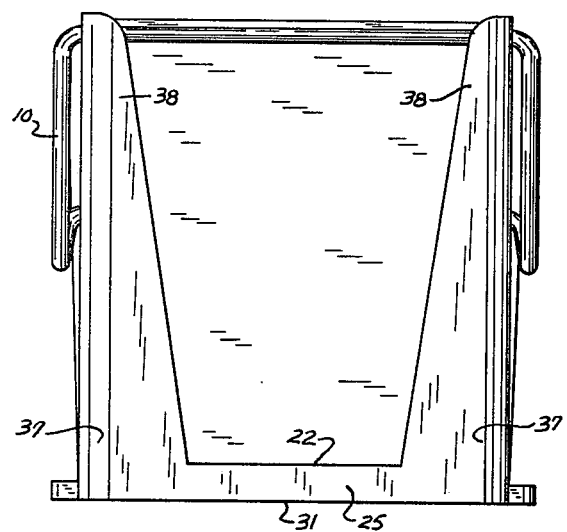
FIG. 4 is a front-elevational view thereof.

As shown in FIG. 1, when the open-sided container 30 is secured to boat wall 3 by wire hanger 10, the base member 25 lies in a substantially horizontal plane. The base 25 is substantially rectangular and has legs 35 disposed vertically upward from the two forward corners 26. Opposite thereto, backing wall 15 is disposed vertically upward from the rearward edge 24 of base 25. Note that the forward corners 26 are rounded while the rearward corners 27 are squared. Rearward corners 27 also includes angle webs 28. The webs 28 provide structural support between base 25 and backing wall 15 as well as sandwiching the lowermost float 7 centrally on the base 25. In performing this latter function, note the inner surfaces 29 of webs 28 align with the inner surfaces 36 of the rearward side portions of curved legs 35. See FIG. 2. Disposed horizontally outward from the lower side edges 23 of base 25 are hook flanges 20. The flanges 20 extend from rearward edge 24 of base 25 forwardly to the intersection of leg 35 with base 25. See FIG. 1. The flanges 20 include apertures 21 which are suitable for holding hook, lures and the like in an easily accessible position. While the top surface 22 of base 25 is substantially flat, the bottom surface 31 is somewhat concave upwardly. This concavity permits the product to "pull-in" during the molding operation of the manufacturing process.

Figure 6:
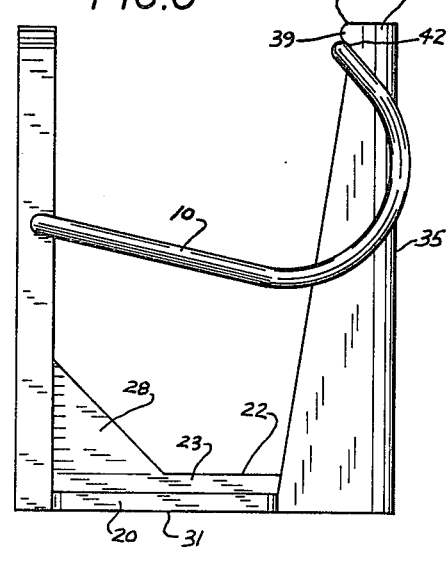
FIGS. 6 and 7 are side-elevational views thereof.
Figure 7:
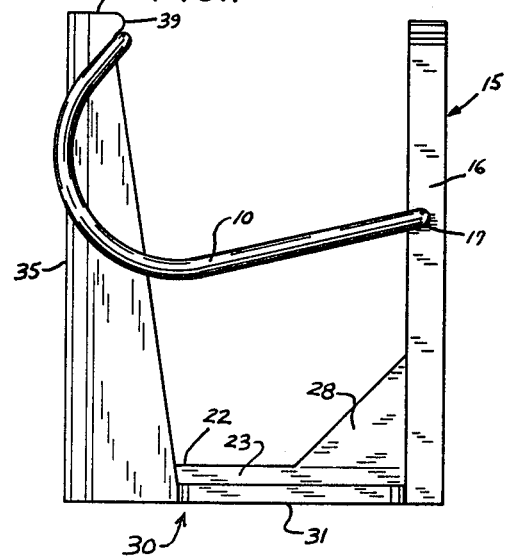

Forward curved legs 35 are disposed upwardly from forward corners and are oriented slightly obtusely with respect to the base 25. This slightly obtuse orientation facilitates easy access to the floats and permits them to be easily stacked and removed. The curved legs commence with broad lower portions 37 which extend around forward corners 26 and taper upward to narrower upper portions 38. The upper portions 38 enclose a smaller angular circumference of a vertical projection of the corners 26 than the broad lower portions 37. Upper portions 38 include rearwardly protruding locking nubs 39 which extend from the uppermost ends 40 of legs 35. The nubs 39 perform a locking function as seen in FIGS. 6 and 7 where the wire 10 is pushed past the nubs 39 and into the locking position. This feature will later be described more fully but it is noted here that the plastic material of the legs 35 gives them a resiliency which permits them to move away as the wire 10 is pushed past the nubs 39 and then spring back to their normal position, locking the wire 10 underneath the nubs 39.

Figure 5:
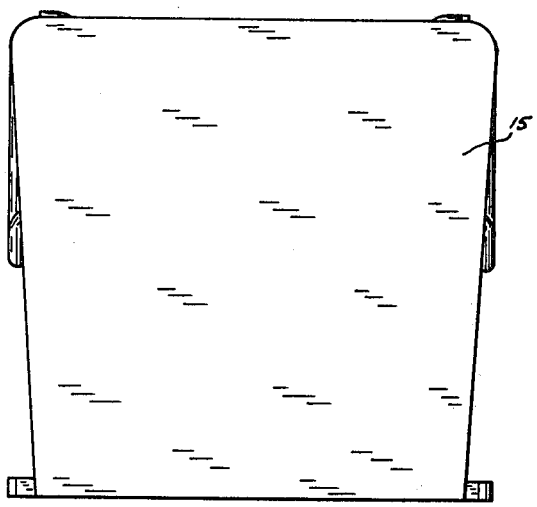
FIG. 5 is a rear-elevational view thereof.

The open sided container 30 is completed by backing wall 15 which is disposed upwardly from the rearward edge 24 of base 25. Backing 15, like legs 35, is oriented slightly obtusely with respect to base 25. The vertical orientation facilitates easy stacking and removal of the floats 7 as well as accounting somewhat for the normal inward slant of the interior surface of a conventional boat wall. The backing 15 has a substantially rectangular shape as best seen in FIG. 5. The backing 15 has a slight downward taper, having a slightly wider top than bottom. Backing 15 includes side edges 16 having apertures 17 formed therein for receiving the securing ends (not shown) of the curved hanger 10. The apertures 17 of backing 15 permit pivotal securement of curved hanger 10 to the open sided container 30.

The curved hanger 10 is of a metal wire material, and commences at horizontal inwardly oriented securing ends (not shown), which are disposed in apertures 17. With reference to FIG. 1, the curved wire progressively includes first small radius elbows 11, arm members 12, large radius elbows 13, second small radius elbows 14, and connecting bar 9. This structure permits the wire hanger 10 to be pivoted upward to a hanging position wherein the large radius elbows 13 can hook about a conventional boat sidewall 3 as shown in FIG. 1. Alternatively, the wire hanger 10 can be pivoted downward so that the large radius elbows enclose legs 35, with second small radius elbows 14 making initial contact with the top edge 41 of nub 39 and then deforming the legs 35 outward to move past the nubs 39 and into the underlying curved surfaces 42; the legs 35 then returning to their normal position to lock the curved hanger 10 in the downward, or storage position, as shown in FIG. 6. In this storage position, connecting bar 9 overlies the stacked floats 7 to prevent them from falling out of container 30 should it be uprighted, or knocked over. It is noted that other embodiments of connecting bar 9 such as the inclusion of a rearwardly disposed portion along the central region of the bar 9 could also be utilized to accomplish this securing function.

It is observed that the open walled structure of the container 30 both reduces raw material requirements, and permits easy access to both the uppermost and lowermost floats 7. The slightly obtuse orientation of the legs 35 and backing 15 with respect to the base 25 additionally facilitates accessibility and unobstructed removal of the floats. The wire hanger 10, when moved to its hanging position easily hooks over a conventional boat wall 3 and positions the container 30 in the interior of the boat near the top of the wall 3 where the floats can be quickly grasped and thrown into the water. When the fishing float container 1 is not in use, the curved wire can be moved to the downward storage position wherein the floats are securely held within the container, and wherein the container and floats can be easily and compactly stored.

Having, thus, disclosed my invention it is obvious that many modifications and variations could be made within its teachings. It is, therefore, to be understood that, within the scope of the appended claims, the invention may be practiced otherwise than as specifically described.

I claim:

1. A fishing float container, comprising:
   a container means for holding one or more fishing floats; and
   a securing means for securing said container means to a wall of a boat, wherein said securing means is pivotally secured to said container means and includes: a large radius elbow for hanging over said wall of said boat in an upward hanging position and for extending along the sides of said container means in a downward storage position; and
   an overlying means for preventing fishing floats from falling out of said container means when in the downward storage position, connected to the large radius elbow distal its pivotal securement and protruding substantially above said container means when in said downward storage position.

2. The fishing float container of claim 1 wherein said container means further includes a resilient locking means for holding said securing means in the storage position.

3. The fishing float container of claim 1 wherein said container means further includes:
   a base member, wherein said base member is substantially horizontal when said container means is in said hanging position;
   a backing member disposed upwardly from a rearward edge of said base member, said securing means being pivotally attached to said backing member; and
   a leg member disposed upwardly from a forward edge of said base member and wherein said locking member is further characterized by having a nub with an underlying curved surface disposed at an upper end of said leg member, said nub being of such size and in such position that when said overlying means is moved from said hanging position to said storage position, a portion of said overlying means will cause said nub to move said leg member resiliently outward, and said overlying means will move into said underlying curved surface as said leg member returns from said resiliently outward position to a normal position.

4. The fishing float container of claim 3 wherein said upwardly disposed leg member is slightly obtusely extended from the base member forward edge.

5. The fishing float container of claim 3 wherein said upwardly disposed backing member is slightly obtusely extended from said base member rearward edge.

6. The fishing float container of claim 1 wherein said container means is a one piece injection molded plastic unit.

7. The fishing float container of claim 6 wherein said securing means is a metal wire having curved portions formed therein.

* * * * *